United States Patent [19]

Geierhaas et al.

[11] 4,009,125
[45] Feb. 22, 1977

[54] SPHERICAL REFINING CATALYST AND PROCESS FOR ITS MANUFACTURE

[75] Inventors: Herbert Geierhaas, Nussloch; Willi Ripperger, Frankenthal; Walter Herrmann, Mannheim, all of Germany

[73] Assignee: BASF Aktiengesellschaft, Ludwigshafen (Rhine), Germany

[22] Filed: July 28, 1975

[21] Appl. No.: 599,524

[30] Foreign Application Priority Data

Aug. 19, 1974 Germany .......................... 2439745

[52] U.S. Cl. .............................. 252/465; 208/216
[51] Int. Cl.² ..................... B01J 21/04; B01J 23/88
[58] Field of Search .................................... 252/465

[56] References Cited

UNITED STATES PATENTS

| 2,873,257 | 2/1959 | Hunter et al. | 252/465 |
|---|---|---|---|
| 3,032,514 | 5/1962 | Malley et al. | 252/465 |
| 3,340,180 | 9/1967 | Beuther et al. | 252/465 X |
| 3,496,117 | 2/1970 | Vesely et al. | 252/465 |

*Primary Examiner*—W. J. Shine
*Attorney, Agent, or Firm*—Johnston, Keil, Thompson & Shurtleff

[57] ABSTRACT

Spherical refining catalysts containing cobalt and/or nickel together with molybdenum on aluminum oxide are prepared in closed mixers provided with mixing elements from spray-dried powders such as catalyst preparations or carriers using peptizing agents. The catalysts thus prepared have a bulk density much higher than that of extrudates of similar composition. Their surface and pore size distribution make them suitable for use in the catalytic refining of hydrocarbon fractions containing metal and asphalt, and particularly for refining vacuum distillates and residues from atmospheric distillation.

5 Claims, 1 Drawing Figure

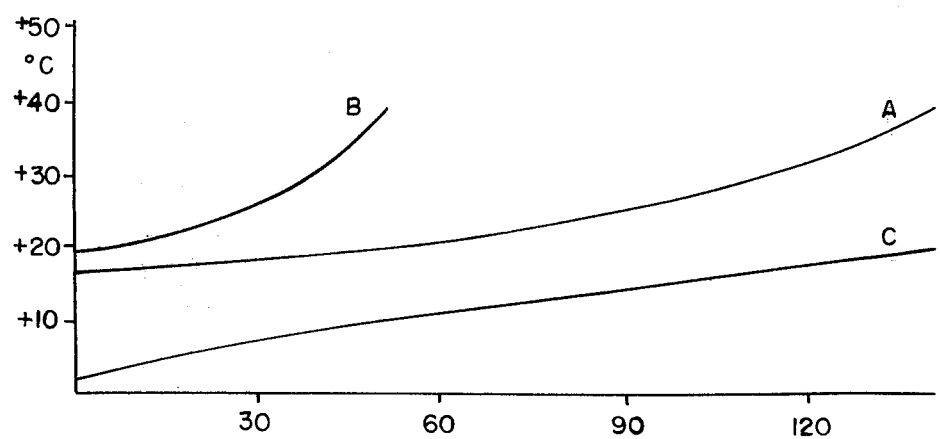

SPHERICAL REFINING CATALYST AND PROCESS FOR ITS MANUFACTURE

The invention relates to a process for the manufacture of spherical refining catalysts which contain cobalt and/or nickel, and molybdenum, as active metals and aluminum oxide as the carrier.

These catalysts are obtained from spray-dried material by adding a peptizing agent, in a mixing apparatus. Catalysts of relatively high bulk density, and of advantageous surface area and pore distribution for use in refining petroleum fractions containing metals and asphalt may be obtained by this process.

As a rule, catalysts which contain the metals cobalt/molybdenum, nickel/molybdenum or nickel/cobalt/molybdenum on aluminum oxide as the carrier are employed for the desulfurization of petroleum fractions containing metals and asphalt, such as residues from atmospheric distillation, or vacuum gas oils.

Though the throughputs used in refining such raw materials are low, ie. from 0.25 to at most 1.0 kg of oil per liter of catalyst per hour, the achievable catalyst life is merely from 2 to 3 months because of deactivation of the catalyst.

The deactivation of the catalyst is attributable to the organometallic compounds (especially of iron and vanadium) contained in the oil, as their decomposition products deposit, together with carbon, on the catalyst and thereby block the pores of the catalyst.

The use of catalysts of large pore volume and of a particular pore size distribution has therefore already been proposed for the refining of residual oils. German Published Application 2,233,943 discloses that good catalysts are obtained when the pore size distribution exhibits a minimum in the range of macropores of diameter greater than 100 A. Such catalysts are obtained in the form of extrudates from spray-dried starting materials, by kneading and extrusion. However, the manufacture of extrudates is expensive and furthermore kneading and densification lower the pore volume originally present, so that if the reduction in pore volume is kept within acceptable limits the achievable bulk densities of extrudates are only from 650 to 700 g/l of catalyst.

For the purpose of hydrogenating residual oils, it is furthermore desirable to use the densest possible packing of the catalyst, to avoid channeling, and to have as high a bulk density as possible, since the capacity for taking up a deposit of metal increases with the weight of the catalyst. (The total capacity is as a rule from 30 to 50 per cent by weight, based on the weight of the catalyst).

It is true that it is known to manufacture spherical catalysts from spray-dried materials by granulation on rotating discs or in drums (cf. H.B. Ries in "Granuliertechnik und Granuliergerate" in Aufbereitungstechnik 1970, No. 3, 5, 10 and 12, pp. 17 et seq.). However, these methods give catalysts which have a low bulk density and a high proportion of macropores in the total pore volume (cf. catalyst B in Table 1).

It is an object of the present invention to provide a catalyst of high pore volume, advantageous pore size distribution, high bulk density and good packing ratio, starting from spray-dried material.

We have found, surprisingly, that this object is achieved by a simple process wherein spherical catalysts of high density, large surface area and optimum pore size distribution for use in refining residual oils are manufactured in a powder mixer provided with mixing elements.

Accordingly, the invention relates to a process for the manufacture of spherical refining catalysts which contain cobalt and/or nickel and molybdenum as active metals and aluminum oxide as the carrier, from spray-dried catalyst preparations or carriers to which the active metals are subsequently applied, in which process the catalyst preparation or the carrier is treated with aqueous solutions of a peptizing agent in powder mixers provided with mixing elements and the resulting spherical granules are dried and calcined.

In the present context, powder mixers are to be understood as mixers with moving mixing elements, eg. Lodige mixers. However, mixers with a moving wall and moving mixing elements, eg. Eirich mixers, may also be used. The mixing elements may be in the shape of ploughshares, spirals, baffle plates, etc.

The speed of rotation of the mixer is set in accordance with the level of filling of the mixer and the desired particle size distribution. As a rule, the mixing process is started at high speeds, eg. from 150 to 200 rpm. When the mixture has reached a plastic state, the speed of the mixer is reduced to from 60 to 90 rpm. The speed greatly depends on the amount of peptizing agent added. It is therefore necessary carefully to balance the speeds, the level of filling and the amount of added peptizing agent. The above data apply only to a particular level of filling for a given set of mixing elements and given dimensions of the apparatus.

The level of filling of the mixer should be from 30 to 70% of the mixer capacity since lower figures result in catalysts of low bulk density.

If the above is observed, bulk densities of 650 to 850 g/l may be achieved, depending on the carrier, the chosen parameters and the particle size. Catalysts with bulk densities of from 710 to 800 g/l are preferred.

Starting materials which may be used for the manufacture of the catalysts according to the invention are spray-dried carriers or catalyst preparations, ie. catalysts containing active metals. In the present context, a catalyst preparation is to be understood as a spray-dried mixture of the carrier with the active metals. Such catalyst preparations as a rule contain from 3 to 6 percent by weight of nickel and/or cobalt and from 12 to 15 percent by weight of molybdenum, each calculated as the oxide and based on total catalyst, if the product is to be used as a refining catalyst. The remainder of the total catalyst consists of aluminum oxide. If a spray-dried carrier is used as the starting material, the active metals must be applied thereto after its granulation, eg. by impregnation or by precipitation. Spray-dried catalyst preparations are preferred as starting materials for the process according to the invention.

It is essential that at least 70% by weight of the carrier should be the $\alpha$-form of aluminum oxide (boehmite) which still contains water of hydration, ie. the T.T. modification. The remainder, up to 30% by weight, can be $\gamma$-$Al_2O_3$. It has been found that if the proportion of $\gamma$-$Al_2O_3$ exceeds 30% by weight the material, on granulation, takes longer to reach the plastic state; the catalyst thus obtained then has too low a bulk density and too high a macropore volume. Hence it is necessary to ensure, even when producing the spray-dried materials, that the drying temperature should not be too high, as this would favor formation of $\gamma$-$Al_2O_3$.

Peptizing agents which may be used are alkalis or acids; ammonia, formic acid, acetic acid and nitric acid are suitable. Ammonia is suitably employed as a solution of from 10 to 28% strength, in amounts of from 50 to 150 ml per 100 g of spray-dried material. Acids are suitably employed in the form of aqueous solutions of from 2 to 4% strength, in amounts of from 10 to 20 ml per 100 g of spray-dried material. The amount of peptizing agent required depends on the intensity of mixing and the granulation time. With high mixing intensities which favor smaller particle size fractions, the amount of peptizing agent added can be low.

The catalysts manufactured according to the invention may be used for the hydrotreating of petroleum fractions containing metals and asphalt. In particular, they may be used for hydrodesulfurization of vacuum distillates of boiling range from 350° to 550° C, ie. of vacuum gas oils, and for desulfurization of residual oils from atmospheric distillation.

The desulfurization is in general carried out at from 350° to 450° C and at total pressures of from 70 to 150 atmospheres, with a hydrogenating gas containing at least 50% by volume of hydrogen, and at throughputs of from 0.25 to 1.5 kg of oil per liter of catalyst per hour. As a rule, degrees of desulfurization of from 75 to 90%, based on the sulfur content of the oil employed are desired.

The manufacture of extrudates (catalyst A) and granules produced on disc granulators (catalyst B), in accordance with the state of the art, is described below. The examples illustrate the process according to the invention. Example 1 describes the manufacture of a catalyst C according to the invention, and in Example 2 this catalyst is compared with catalysts of the art (A and B). Manufacture of catalysts A and B:

Catalysts A and B were both manufactured from a spray-dried catalyst preparation.

To manufacture the carrier, hydrated aluminum oxide was precipitated from an aluminum sulfate solution by means of aqueous ammonia at 50° C, whilst stirring. This hydrated oxide was washed free from sulfate with ammonium carbonate solution and suspended in a dilute ammoniacal cobalt molybdate solution in order to apply the active catalyst constituents. The suspension was dried in a spray tower at a maximum exit temperature of 200° C. The properties of the spray-dried material thus obtained are shown in Table 1, together with those of catalysts A, B and C.

To manufacture catalyst A, 500 g of the spray-dried material shown in Table 1 were kneaded for one hour in a kneader, whilst adding 100 ml of 25% strength aqueous ammonia. After this treatment, the spray-dried material was plastic and was extruded to 1.5 mm ribbon on an extruder at a pressure of 160 kg/cm². This extrudate was dried for 12 hours at 150° C, cut to lengths of from 3 to 5 mm and then calcined for 4 hours at 500° C. The properties, such as particle size distribution, pore volume and pore size distribution, and bulk density of catalyst A are shown in Table 1.

To manufacture catalyst B, 15 g of spray-dried powder per minute were sprayed continuously onto fines from a previous batch in a disc granulator of 500 mm diameter running at 180 rpm, and the amount of water required as the granulating liquid was injected. After 6 hours, spherical granules of from 2 to 3 mm diameter were obtained as the material flowing over the edge of the disc. At that stage, the disc carried about 3 l of granules. The properties of catalyst B produced in a disc granulator are shown in Table 1.

The example which follows further illustrates the process according to the invention.

EXAMPLE 1

Manufacture of catalyst C:

700 g of the spray-dried catalyst preparation specified in Table 1 are introduced into a Lodige laboratory mixer having a friction-plate cover (drum diameter 190 mm, length 175 mm). The speed was set to 150 rpm. 600 ml of 14.5% strength aqueous solution of ammonia were injected in the course of 15 minutes. The speed was then reduced to 75 rpm. After a further 30 minutes, the spray-dried material became plastic and agglomeration occurred. Spheres of average diameter form 1 to 2 mm formed. The further properties of the catalyst obtained after drying and calcining at 550° C are shown in Table 1.

Comparison of the data for pore volume, pore size distribution and bulk density shown in Table 1 gives the following picture: whilst having approximately the same pore size distribution as catalyst A, the catalyst obtained by granulation in the Lodige mixer (which was fitted with ploughshare-like paddles) had a bulk density which was about 12% higher. The catalyst B manufactured in accordance with the state of the art, in a disc granulator, from the same catalyst preparation, on the other hand only had a bulk density of 450 g/l and a very unfavorable pore size distribution, ie. a high proportion of macropores which is undesirable for desulfurization of petroleum residues.

USE EXAMPLE

Catalyst C according to the invention, manufactured in Example 1, and catalysts A and B of the art were subjected to an activity test in which a topped Kuwait residue was subjected to hydrosulfurization to reduce its sulfur content by 75%. The residual oil used had the following properties:

| | |
|---|---|
| density: | 0.960 g/l |
| viscosity at 100° C: | 37 cSt. |
| sulfur content: | 4.05 per cent by weight |
| metal content: | |
| Ni | 16 ppm |
| V | 45 ppm |
| Conradson-C | 10.1 per cent by weight |
| asphaltenes | 2.9 per cent by weight |

To carry out the test, catalysts A, B and C were respectively placed in a fixed bed tubular reactor. The throughput was 0.50 kg of oil per liter of catalyst per hour, under a total pressure of 100 atmospheres. The hydrogenating gas contains 80% by volume of $H_2$, the remainder being methane. FIG. 1 shows, as the ordinate, the temperature rise in ° C for catalysts A, B and C at 74% desulfurization, against the running time in days as the abscissa.

It may be seen from FIG. 1 that under the stated experimental conditions lives of about 5 months are achieved with extrudates obtained from spray-dried material (catalyst A), and lives of only 1½ months with catalyst B produced in a disc granulator. On the other hand, substantially longer lives are achieved with catalyst C manufactured according to the invention. Because of its high bulk density and the resulting increased availability of active components and surface area per liter of reaction space, an initial temperature which is 15° C lower suffices, in the case of the catalyst manufactured according to the invention, to achieve a degree of desulfurization of 75%. Hence, the maximum permissible temperature level had not yet been reached at the end of the test when using the process according to the invention, whilst it was reached with catalyst A of the art. Because of the temperature reserve of 20° C, a substantially longer life still may be expected from catalyst C according to the invention.

TABLE 1

|  | Spray-dried material | A | B | C |
| --- | --- | --- | --- | --- |
| Composition |  |  |  |  |
| CoO, % by weight | 5.0 | 5.0 | 5.0 | 5.0 |
| MoO$_3$, % by weight | 13.5 | 13.5 | 13.5 | 13.5 |
| Al$_2$O$_3$ | 56.0 |  |  |  |
| Loss in weight on calcining at 500° C | 25.5 |  |  |  |
| BET surface area in m$^2$/g | 268 | 300 | 318 | 274 |
| Particle size distribution |  |  |  |  |
| >200 μ | 23.5 |  |  |  |
| >100 μ | 59.0 |  |  |  |
| >60 μ | 82.0 |  |  |  |
| <60 μ | 18.0 |  |  |  |
| Total pore volume ml/g |  | 0.62 | 1.16 | 0.64 |
| Pores of diameter |  |  |  |  |
| <75 A |  | 0.52 | 0.65 | 0.59 |
| >75 A (ml/g) |  | 0.10 | 0.51 | 0.05 |
| Bulk density (g/l) |  | 670[1] | 450[2] | 765[2] |

[1] 1.5 mm extrudates
[2] particle size fraction of from 2 to 3 mm.

We claim:

1. A process for manufacture of spherical refining catalysts which comprises granulating by agitation in a powder mixer having moving mixing elements, a spray dried catalyst powder composed of 3 to 6% by weight of cobalt oxide or nickel oxide or mixtures thereof and from 12 to 15% by weight of molybdenum oxide, based on the total catalyst, and Al$_2$O$_3$ as the carrier, said Al$_2$O$_3$ carrier containing not more than 30% by weight of γ-Al$_2$O$_3$, adding an aqueous solution of a peptizing agent during the granulation step, and thereafter drying and calcining the resultant spherical granules.

2. A process as claimed in claim 1 wherein at least 70% of said Al$_2$O$_3$ carrier is boehmite which contains water of hydration.

3. A process as claimed in claim 1 wherein peptizing agent is a member selected from the group consisting of ammonia, formic acid, acetic acid and nitric acid.

4. A process as claimed in claim 1 wherein the mixing of said powder and said peptizing agent is continued until the mixture becomes a plastic mass.

5. A catalyst useful for the fixed bed hydrotreating of petroleum fractions containing metals and asphalt which comprises dried and calcined spherical granules of an Al$_2$O$_3$ carrier, said granules being spray dried particles of Al$_2$O$_3$ containing not more than 30% γ-Al$_2$O$_3$ derived by mixing said particles and an aqueous solution of a peptizing agent, said Al$_2$O$_3$ carrier having deposited or its particles 3–6% by weight of nickel oxide or cobalt oxide and 12–15% by weight of molybdenum oxide, and said spherical granules having a bulk density in the range of 650–850 g/l.

\* \* \* \* \*